United States Patent [19]

Morokawa

[11] Patent Number: 4,581,649

[45] Date of Patent: Apr. 8, 1986

[54] IMAGE PICKUP SYSTEM

[75] Inventor: Shigeru Morokawa, Tokorozawa, Japan

[73] Assignee: Citizen Watch Co., Ltd., Shinjuku, Japan

[21] Appl. No.: 593,831

[22] Filed: Mar. 27, 1984

[30] Foreign Application Priority Data

Apr. 8, 1983 [JP] Japan .................................. 58-61650

[51] Int. Cl.$^4$ ............................................. H04N 3/14
[52] U.S. Cl. ................................................ 358/212
[58] Field of Search ............... 358/213, 212, 209, 163, 358/208, 227; 382/54; 178/30; 371/30

[56] References Cited

U.S. PATENT DOCUMENTS

| 2,080,942 | 5/1937 | Joers | 358/209 |
|---|---|---|---|
| 3,191,913 | 6/1965 | Mettler et al. | 366/127 |
| 4,167,754 | 9/1979 | Nagumo et al. | 358/212 |
| 4,383,170 | 5/1983 | Takagi et al. | 250/578 |
| 4,470,065 | 9/1984 | Reitmeier | 358/163 |
| 4,481,539 | 11/1984 | Meise et al. | 358/213 |

FOREIGN PATENT DOCUMENTS 53-101939 9/1978 Japan .

Primary Examiner—Gene Z. Rubinson
Assistant Examiner—Stephen Brinich
Attorney, Agent, or Firm—Birch, Stewart, Kolasch & Birch

[57] ABSTRACT

An image pickup system has an image sensor including a plurality of photodetectors arranged in two dimensions and an optical system having a lens for forming an image on the image sensor so that the image sensor produces picture data. A vibrator is provided for vibrating the image on the image sensor so as to oscillate the picture data, and a scanner is provided to be operative in synchronism with the vibration of the image for changing the oscillated picture data to data for a fixed image. A memory is provided for storing the data for a fixed image and a majority logic circuit is provided for selecting the most reliable data from the data stored in the memory and for producing a picture data for the image on the image sensor.

10 Claims, 15 Drawing Figures

IMAGE PICKUP SYSTEM

BACKGROUND OF THE INVENTION

The present invention relates to an image pickup system provided with an image sensor.

The image sensor comprises a plurality of photodetectors disposed on a semiconductor chip. It is very difficult to manufacture an image sensor without defective photodetectors, which means that the yield of perfect image sensor is very low, and hence the price of the perfect image sensor is very high. Accordingly, such an expensive image sensor can not be used for general purposes.

SUMMARY OF THE INVENTION

The object of the present invention is to provide an image pickup device employing an image sensor, which can be used as an image pickup device, even if the image sensor includes defective photodetectors.

To this end, according to the present invention, the system includes an image sensor having a plurality of photodetectors arranged in two dimensions, an optical system for forming an image on the image sensor so that the image sensor produces picture data, a vibrator for vibrating the image on the image sensor so as to oscillate the picture data, and a scanner operative in synchronism with the vibration of the image for changing the oscillated picture data to data for a fixed image. The system further includes a memory for storing the data for a fixed image, and a data analyzing and deciding circuit such as a majority decision circuit for selecting the most reliable data from the data stored in the memory and for producing a picture data for the image on the image sensor.

Other objects and features of the present invention will become more apparent from the following description with reference to the accompanying drawings.

DETAILED DESCRIPTION OF THE INVENTION

Figure 1:
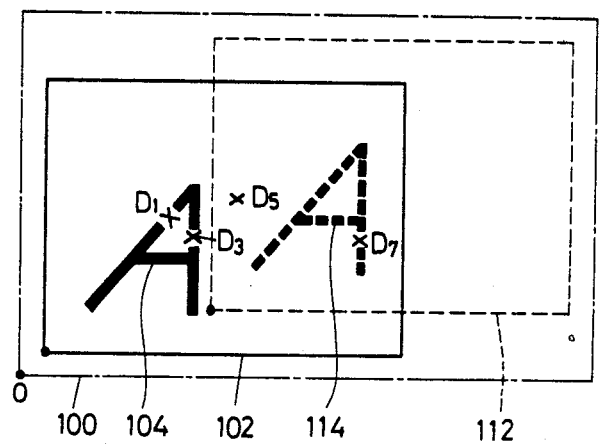
FIGS. 1 and 2A–2D are illustrations for explaining the principle of the present invention.

Referring to FIG. 1, reference numeral 100 designates an image sensor comprising a plurality of photodetectors which are arranged on a semiconductor chip in two mosaic. An image 104 in a picked-up picture 102 corresponding to an object is formed in the image sensor. The image sensor has defective photodetectors $D_1$, $D_3$, $D_5$, $D_7$. In the image 104, defective photodetectors $D_1$ and $D_3$ are included to make the corresponding portion blank. If the image sensor 100 is shifted a small distance, the picture 102 is moved to a position in a picked-up picture 112 and an image 114 is formed in a corresponding position. In the shifted position, the image 114 includes defective photodetector $D_7$. If both images 104 and 114 are superimposed, an image without blanks can be produced.

Figures 2A, 2B, 2C, 2D:
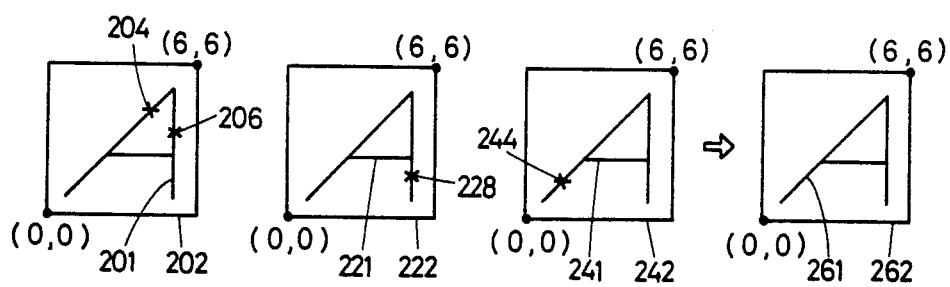

FIGS. 2A to 2C show three pictures 202, 222, 242 which are picked-up at different portions of an image sensor, respectively. An image 201 includes defective photodetectors 204 and 206, an image 221 has a defective detector 228, and an image 241 has a defective detector 244. The defective photodetector 204 has the co-ordinates (5,5) in the picture 202 to make a blank at the position. However, in each of pictures 221 and 241, the position (5,5) is black. Positions of other defective detectors do not coincide with each other. Accordingly, if all picture elements (photodetectors) of three pictures are superimposed in accorance with the principle of majority rule, a complete image data 261 without blanks can be formed in a combined picture 262 as shown in FIG. 2D.

Figure 3A:
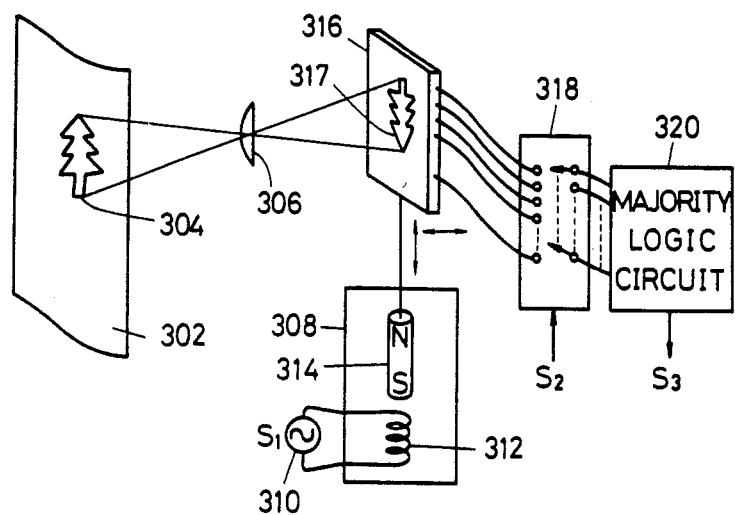
FIG. 3A schematically shows an embodiment of the present invention.

FIG. 3A shows schematically an embodiment of the present invention. An object 304 on a subject 302 is projected on an image sensor 316 through a lens 306 to form an image 317. The image sensor 316 is operatively connected to a plunger 314 of a vibrator 308. The plunger 314 is reciprocated by exciting a solenoid 312 which is excited by a vibration signal generator 310 in dependency on signal $S_1$, so that the image sensor 316 is reciprocated. Thus the image 317 on the image sensor is reciprocated in relation to the image sensor, although the position of the image does not change in the absolute co-ordinates.

Picture signals from the image sensor 316 are applied to a scanner 318, so that the vibrating signals are changed to fixed picture signals by a signal $S_2$ synchronizing with the signal $S_1$. The fixed picture signals are applied to a majority logic circuit means 320 by which blanks by defective photodetectors in the image sensor are recovered. Thus, the majority logic circuit means 320 produces repaired picture data $S_3$. The repaired picture data may be obtained in parallel or in series.

It is difficult to directly deal with analog data in accordance with the principle of majority rule, since the rule is not clearly defined. In this specification, various selecting methods are regarded as the majority rule. A first method is that analog data are sorted to a plurality of classes by amount of each data, and sorted data having the highest frequency in amount are selected and the amount is regarded as the most reliable data.

A second method is that analog data are compared with a reference value by comparators so as to sort the data into a high level data and a low level data. Then, the data are dealt with a majority logic circuit to select a data. A third method is that analog data is converted to digital data by an analog-to-digital converter (A/D converter) in time division and the digital data are sequentially stored in memories. The digital data are dealt with in accordance with a principle of majority rule to select a data.

Figure 4A:
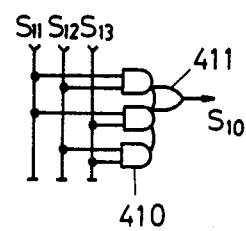
FIGS. 4A and 4B show majority logic circuits.
Figure 4B:
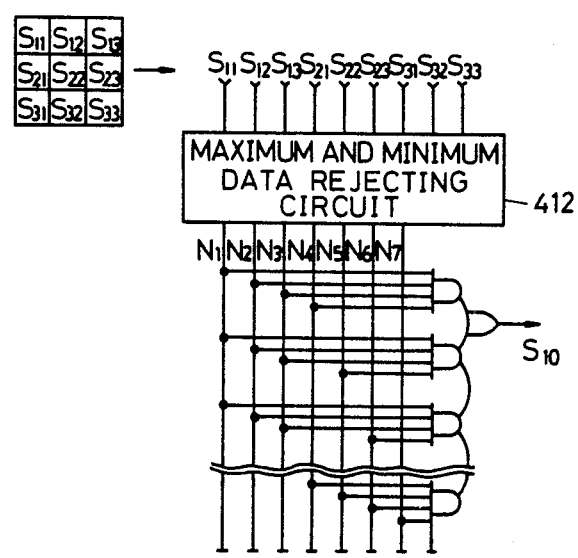

FIG. 4A shows an example of a majority logic circuit according to the above described second method. Each of data $S_{11}$, $S_{12}$, $S_{13}$ has a high level or a low level. The data are dealt with three AND gates 410 and OR gate 411 which produces a repaired data $S_{10}$ in accordance with the majority rule. FIG. 4B shows another example of a majority logic circuit for nine data $S_{11}$ to $S_{33}$. The data are applied to a maximum and minimum data rejecting circuit 412, by which data having maximum value and minimum value are removed, in order to reduce the effect by such extremely deviated data. Further, the remaining seven data are converted to data $N_1$ to $N_7$ each having high or low level and are applied to a majority logic circuit comprising a plurality of AND gate or an OR gate to produce a repaired data $S_{10}$.

As another method of selecting a data, the above described third method can be used. That is, the remaining seven analog data are converted to digital data by an A/D converter and the digital data are stored in a digital memory. The stored digital data are sorted to form a histogram. From the histogram, a data having the highest frequency is selected as the most reliable data. Further, it is possible to select a data having a central value in accordance with the method of least squares.

Figure 5:
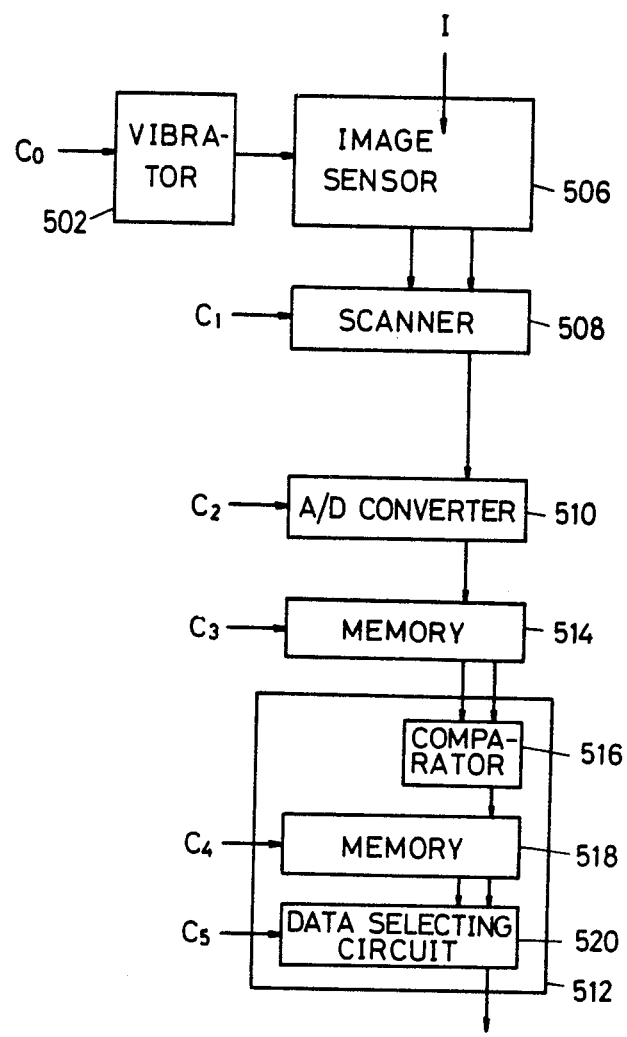
FIG. 5 schematically shows another embodiment of the present invention.

FIG. 5 shows a system according to the present invention, employing the third method. An image sensor 506 receiving an image I is vibrated by a vibrator 502 in accordance with a signal $C_0$. Output data of the image sensor 506 are converted to fixed data by a scanner 508 in accordance with a signal $C_1$. Output data of the scanner are converted to digital data by an A/D converter 510 and then sequentially stored in a memory 514 or a data selecting unit 512 in accordance with signals $C_2$ and $C_3$. The stored data are compared with various reference values by a comparator 516 so as to form a histogram. The histogram is stored in a memory 518 in dependency on a signal $C_4$. From the stored data, most reliable data are selected by a data selecting circuit 520 by a principle of majority rule or the method of least squares in accordance with a signal $C_5$. Thus, selected picture data are produced from the data selecting circuit 520.

Figure 6A:
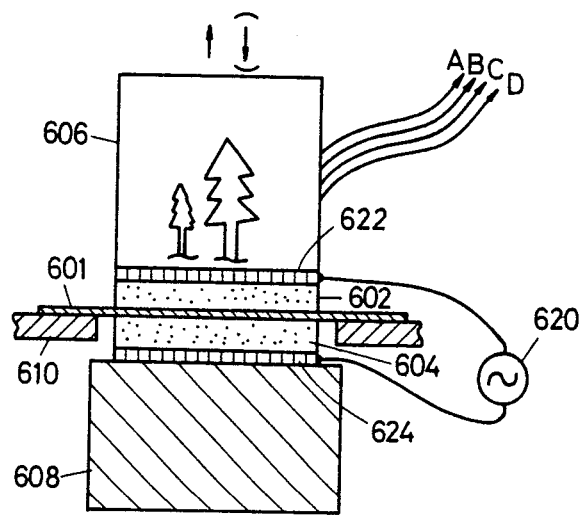
FIGS. 6A to 6C show a vibration device for an image sensor and graphs showing data sampling and register thereof.

FIG. 6A shows an example of a vibrator. The vibrator comprises a pair of piezoelectric vibrator element 602 and 604 disposed on both sides of a support plate 601 which is supported on a support 610. The piezoelectric vibrator element may be barium titanate, Rochell salt, rock crystal, and the like. Mounted on the vibrator element 602 is an electrode 622 on which an image sensor 606 is mounted. On the other hand, a counter balancer 608 is secured to an electrode 624 of the vibrator element 604. Accordingly, when both vibrator elements 602 and 604 are driven by a signal from a driving signal source 620, image sensor 606 and balancer 608 are reciprocated in the reverse direction. Thus, the vibration of the system is cancelled.

Figure 6B:
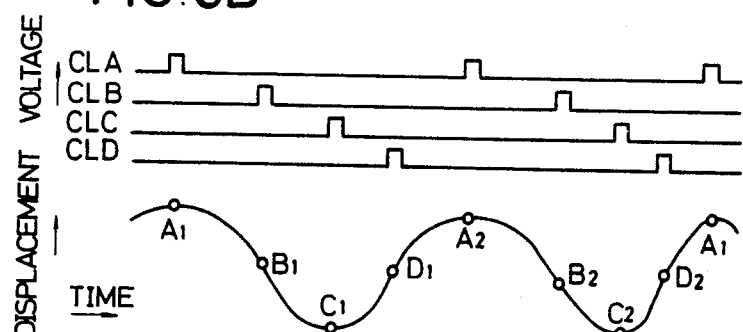
Figure 6C:
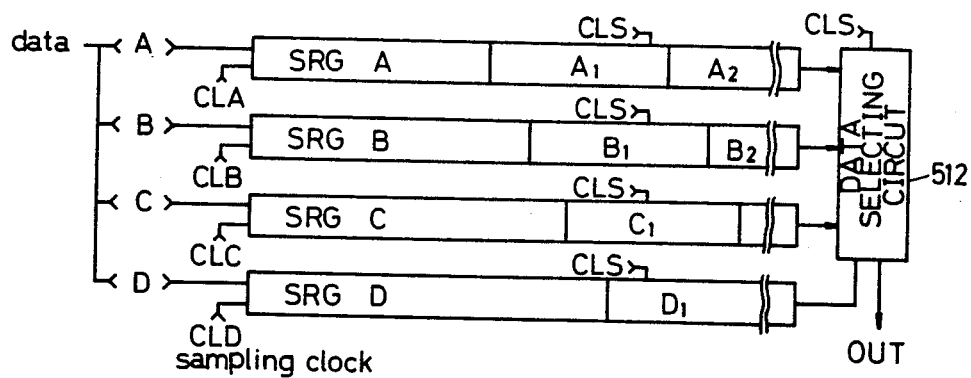

FIG. 6B shows the relationship between the displacement of the image sensor and the phase of data sampling. The system produces four picture data A, B, C and D by sampling clocks CLA, CLB, CLC, and CLD which are different in phase. As shown in FIG. 6C, those data A, B, C, D are registered in respective shift registers SRG A, SRG B, SRG C, and SRG D and shifted by clock signals CLS. The shift registers correspond to the memory 514 of FIG. 5. The registered data are applied to the data selecting unit 512 corresponding to the unit of FIG. 5, so that the most reliable output are selected.

Although the image sensor is vibrated in the direction of one dimension, it may be vibrated in two dimensions. Further, the sensor is vibrated in the direction of the axis of a lens, so that data of clear image are selected to form a clear picture. As a vibrator, various electromechanical transducers such as a buzzer or an electric motor can be employed. By vibrating an image sensor at random or pseudo-random, it is possible to disperse the probability of generation of the defective detector in an image in such a manner as white noise. The vibration at pseudo-random has amplitudes within a predetermined range and frequencies in a predetermined range.

As an image sensor, an image sensor of MOS solid type, CCD (charge-coupled device) type or BBD (Bucket brigade device) type may be employed. The image sensor, scanner, and other circuits such as majority logic circuit can be formed on one chip.

Although in the above described embodiment, the image on an image sensor is vibrated by vibrating the image sensor, a system in which an image sensor is fixed and another element in the optical system, such as a lens is vibrated to vibrate the image on the sensor can be provided in accordance with the present invention.

Figure 3B:
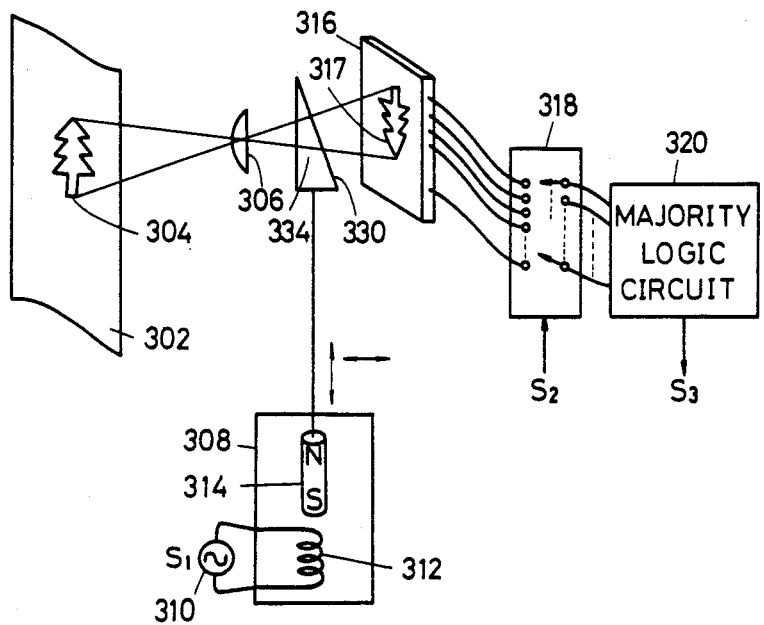
FIG. 3B shows another embodiment of the present invention.

FIG. 3B shows another embodiment of the present invention in which a part of the optical system is vibrated. In the system, a prism 330 is provided in the optical system and is adapted to be vibrated by the vibrator 308. Other components of the system are the same as FIG. 3A and identified by the same reference numerals. By vibrating the prism 330 in the direction of the arrow, the image 317 on the image sensor is vibrated. The image 317 is also vibrated by swinging the prism 330 about an axis 331. Moreover, it is possible to vibrate the image on the image sensor by vibrating the lens 306 or by swinging a mirror provided in the optical system.

In the above described systems, data sensed by a defective photodetector are used as it is. However, if the data by the defective detector, the position of which is known is supplemented with a proper value, more reliable picture data can be produced. An additional method is to supplement the data of the defective detector with the data of an adjacent detector. The other method is to supplement with an average value of detectors at both sides.

Figure 7A:
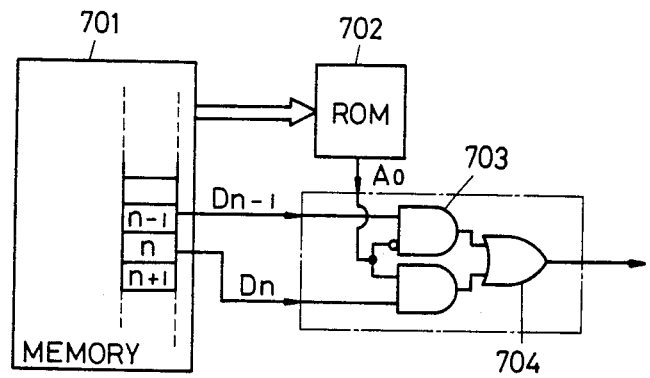
FIGS. 7A and 7B show systems for supplementing data by defective photodetectors with proper data.

FIG. 7A shows an example of the former method. A memory 701 corresponds to the memory 514 and a ROM 702 in which data at addresses of defective detectors are stored is provided. The ROM is so arranged to produce a low level output $A_0$, when an address signal is of a defective data. In the memory 701, data $D_n$ at address n is defective. When the memory element at the address n is addressed, the address data n is applied to the ROM 702, so that the ROM produces a low level $A_0$ output. Accordingly an AND gate 703 produces a data $D_{n-1}$ which is previously stored at adjacent address. The data $D_{n-1}$ is produced from an OR gate 704 as a data at the address n.

Figure 7B:
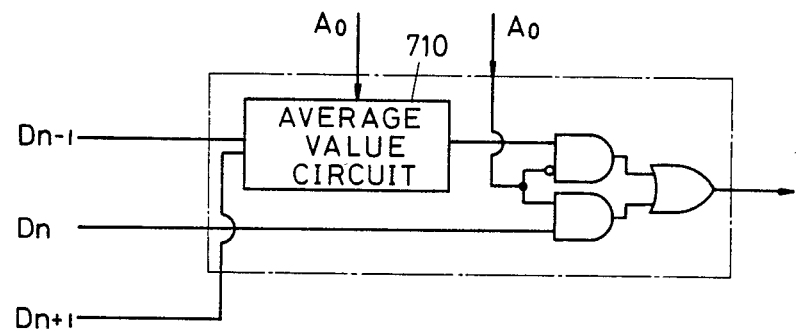

FIG. 7B shows an example of the latter method. The system is provided with an average value circuit 710 which produces an average value of data $D_{n-1}$ and $D_{n+1}$ at both sides of the defective address n. When the low level output $A_0$ of the ROM 702 is applied to the average value circuit 710, the circuit produces the average value which passes through AND gate 703. The OR gate 704 produces an output as a data for the defective detector. Thus, data by defective photodetectors are supplemented by proper values, thereby producing more reliable picture data.

While the invention has been described in conjunction with preferred specific embodiments thereof, it will be understood that this description is intended to illustrate and not limit the scope of the invention, which is defined by the following claims.

What is claimed is:

1. An image pickup system comprising:

an image sensor including a plurality of photodetectors arranged in two dimensions and having a plurality of first output terminals corresponding thereto;

an optical system forming an image on said image sensor wherein said image sensor produces a picture data signal at said first output terminals;

vibrator means for vibrating said image on said image sensor wherein said picture data signal moves at said first output terminals in synchronization with said image;

scanning means, having a plurality of second output terminals corresponding thereto and operative in synchronism with the vibration of said image, for rendering said moving picture data signal at said first output terminals stationary on a predetermined one of said second output terminals and for changing said stationary signal into sequential picture data signals at said second output terminals;

memory means for storing said picture data signals; and means for determining reliable data from said picture data signals stored in said memory means and for producing a picture data for said image on said image sensor.

2. The image pickup system according to claim 1 wherein said vibrator means is an electromechanical transducer.

3. The image pickup system according to claim 2 wherein said electromechanical transducer is a piezoelectric element.

4. The image pickup system according to claim 1 wherein the vibration of said image has amplitudes within a predetermined range and frequencies within a predetermined range are pseudo-random.

5. The image pickup system according to claim 1 wherein the vibration of said image is in a plane of two dimensions.

6. The image pickup system according to claim 1 wherein the vibration has a frequency.

7. The image pickup system according to claim 1 wherein said vibrator means is means for vibrating a part of said optical system.

8. The image pickup system according to claim 7 wherein said part is a lens.

9. The image pickup system according to claim 7 wherein said part is a prism.

10. The image pickup system according to claim 1 wherein said determining means includes a majority logic circuit which selects reliable data.

* * * * *